United States Patent
Chan

(10) Patent No.: US 11,450,141 B2
(45) Date of Patent: Sep. 20, 2022

(54) ELECTRONIC DEVICE WITH FINGERPRINT SENSING FUNCTION AND FINGERPRINT COMPARISON METHOD

(71) Applicant: Egis Technology Inc., Taipei (TW)

(72) Inventor: Ming Shan Chan, Taipei (TW)

(73) Assignee: Egis Technology Inc., Hsinchu (TW)

( * ) Notice: Subject to any disclaimer, the term of this patent is extended or adjusted under 35 U.S.C. 154(b) by 0 days.

(21) Appl. No.: 17/226,098

(22) Filed: Apr. 9, 2021

(65) Prior Publication Data

US 2022/0075984 A1 Mar. 10, 2022

Related U.S. Application Data

(60) Provisional application No. 63/075,840, filed on Sep. 9, 2020.

(30) Foreign Application Priority Data

Feb. 4, 2021 (CN) .......................... 202110157575.4

(51) Int. Cl.
*G06V 40/00* (2022.01)
*G06T 3/40* (2006.01)
*G06V 40/12* (2022.01)
*G06V 40/13* (2022.01)
*G06V 10/98* (2022.01)

(52) U.S. Cl.
CPC ............ *G06V 40/1365* (2022.01); *G06T 3/40* (2013.01); *G06V 10/98* (2022.01); *G06V 40/1318* (2022.01)

(58) Field of Classification Search
CPC .... G06K 9/00087; G06K 9/0004; G06K 9/03; G06T 3/04
See application file for complete search history.

(56) References Cited

U.S. PATENT DOCUMENTS 10,432,602 B2  10/2019 An et al.
11,163,970 B1 * 11/2021 Sammoura ........... G06K 9/2027
(Continued)

FOREIGN PATENT DOCUMENTS

CN  109583286  4/2019
CN  109670417  4/2019
(Continued)

OTHER PUBLICATIONS

"Office Action of Taiwan Counterpart Application", dated Feb. 14, 2022, p. 1-p. 5.

*Primary Examiner* — Lixi C Simpson
(74) *Attorney, Agent, or Firm* — JCIPRNET

(57) ABSTRACT

An electronic device with fingerprint sensing function and a fingerprint comparison method are provided. The electronic device includes a fingerprint sensor and a processor. The fingerprint sensor is configured to obtain a first fingerprint image. The processor is coupled to the fingerprint sensor and configured to execute a fingerprint comparison operation to compare the first fingerprint image with a first registered image. When comparison between the first fingerprint image and the first registered image fails, the processor adjusts an image resolution of one of the first fingerprint image and the first registered image, and re-executes the fingerprint comparison operation to determine whether a current fingerprint sensing passes fingerprint verification.

12 Claims, 4 Drawing Sheets

(56) References Cited

U.S. PATENT DOCUMENTS

2016/0147987 A1* 5/2016 Jang .................. G06F 21/32
                                                726/19
2018/0218196 A1   8/2018 Chhabra
2020/0151419 A1* 5/2020 Hansen .............. G06K 9/00033
2020/0285882 A1* 9/2020 Skovgaard Christensen ...............
                                                G06K 9/0002
2021/0397813 A1* 12/2021 Lee .................... G06K 9/0004

FOREIGN PATENT DOCUMENTS

| CN | 111507146 | 8/2020 |
| TW | I557649 | 11/2016 |
| TW | I640930 | 11/2018 |
| TW | 202001644 | 1/2020 |

* cited by examiner

ELECTRONIC DEVICE WITH FINGERPRINT SENSING FUNCTION AND FINGERPRINT COMPARISON METHOD

CROSS-REFERENCE TO RELATED APPLICATION

This application claims the priority benefit of U.S. Provisional Application No. 63/075,840, filed on Sep. 9, 2020, and China Application No. 202110157575.4, filed on Feb. 4, 2021. The entirety of each of the above-mentioned patent applications is hereby incorporated by reference herein and made a part of this specification.

BACKGROUND

Technical Field

The disclosure relates to a device and a biometric comparison method, and more particularly to an electronic device with fingerprint sensing function and a fingerprint comparison method.

Description of Related Art

Regarding current electronic devices (such as mobile phones or tablets) with fingerprint sensing function, if the in-display fingerprint sensing technology is adopted for fingerprint verification and unlocking operations, the image resolution of the fingerprint image obtained by the fingerprint sensor will usually be affected by the protective film attached onto the display panel, which leads to a difference in optical magnification caused by the different physical distance between the fingerprint image obtained by the fingerprint sensor and the registered fingerprint image, thereby greatly increasing the chance of failure of the fingerprint verification and unlocking operations due to a difference in the image resolution. In view of the above, several solutions are provided in the following embodiments.

SUMMARY

The disclosure provides an electronic device with fingerprint sensing function and a fingerprint comparison method, which can provide effective fingerprint comparison function.

The electronic device with fingerprint sensing function of the disclosure includes a fingerprint sensor and a processor. The fingerprint sensor is configured to obtain a first fingerprint image. The processor is coupled to the fingerprint sensor and configured to execute a fingerprint comparison operation to compare the first fingerprint image and a first registered image. When comparison between the first fingerprint image and the first registered image fails, the processor adjusts an image resolution of one of the first fingerprint image and the first registered image, and re-executes the fingerprint comparison operation to determine whether a current fingerprint sensing passes fingerprint verification.

The fingerprint comparison method of the disclosure includes the following steps. The first fingerprint image is obtained through the fingerprint sensor. The fingerprint comparison operation is executed through the processor to compare the first fingerprint image with the first registered image. When comparison between the first fingerprint image and the first registered image fails, the processor adjusts the image resolution of one of the first fingerprint image and the first registered image, and re-executes the fingerprint comparison operation to determine whether the current fingerprint sensing passes fingerprint verification.

Based on the above, the electronic device with fingerprint sensing function and the fingerprint comparison method of the disclosure may adjust the image resolution of one of the fingerprint image and the registered image to perform fingerprint comparison multiple times, thereby increasing the success rate of fingerprint comparison.

In order to make the aforementioned features and advantages of the disclosure comprehensible, embodiments accompanied with drawings are described in detail below.

DESCRIPTION OF THE EMBODIMENTS

Figure 1:
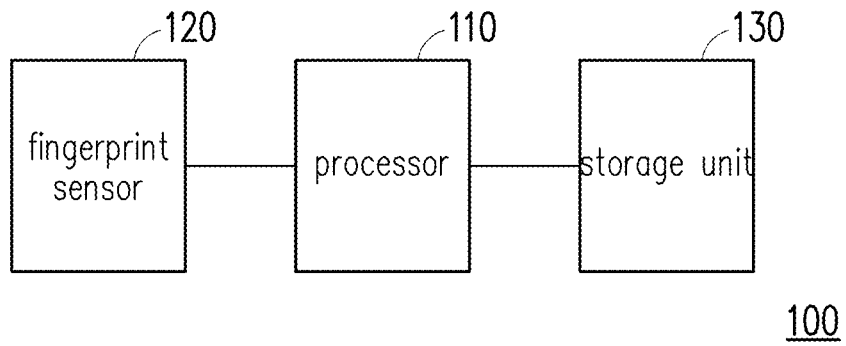
FIG. 1 is a block diagram of an electronic device according to an embodiment of the disclosure.

In order to make the content of the disclosure easier to understand, the following specific embodiments are illustrated as examples of the actual implementation of the disclosure. In addition, wherever possible, elements/components/steps with the same reference numerals in the drawings and embodiments represent the same or similar parts.

FIG. 1 is a block diagram of an electronic device according to an embodiment of the disclosure. With reference to FIG. 1, an electronic device 100 includes a processor 110, a fingerprint sensor 120, and a storage unit 130. The processor 110 is coupled to the fingerprint sensor 120 and the storage unit 130. In the embodiment, the electronic device 100 may be, for example, an electronic product or a terminal device with fingerprint sensing function, such as a computer apparatus, a mobile device, or a tablet computer. Alternatively, in an embodiment, the electronic device 100 may be a fingerprint sensing module and is adapted to be integrated into a terminal device. In the embodiment, the fingerprint sensor 120 may be an optical fingerprint sensor. The electronic device 100 may further include a display panel, and the fingerprint sensor 120 may be integrated or disposed beneath the display panel. In the embodiment, after obtaining a fingerprint image, the fingerprint sensor 120 may provide the fingerprint image to the processor 110 for comparison and image processing.

In the embodiment, the processor 110 may include a processing circuit or a computing circuit with specific function, and the storage unit 130 may include a memory. The storage unit 130 may be configured to store the image data in the embodiments of the disclosure and related computing and analysis software implementing the disclosure for the processor 110 to access and execute. In the embodiment, the processor 110 and the storage unit 130 may be, for example, a central processing unit (CPU) and a memory of a computer apparatus, a mobile device, or a tablet computer, but the disclosure is not limited thereto. In an embodiment, the processor 110 and the storage unit 130 may be, for example, a functional chip and a memory integrated in a fingerprint sensing module.

Figure 2:
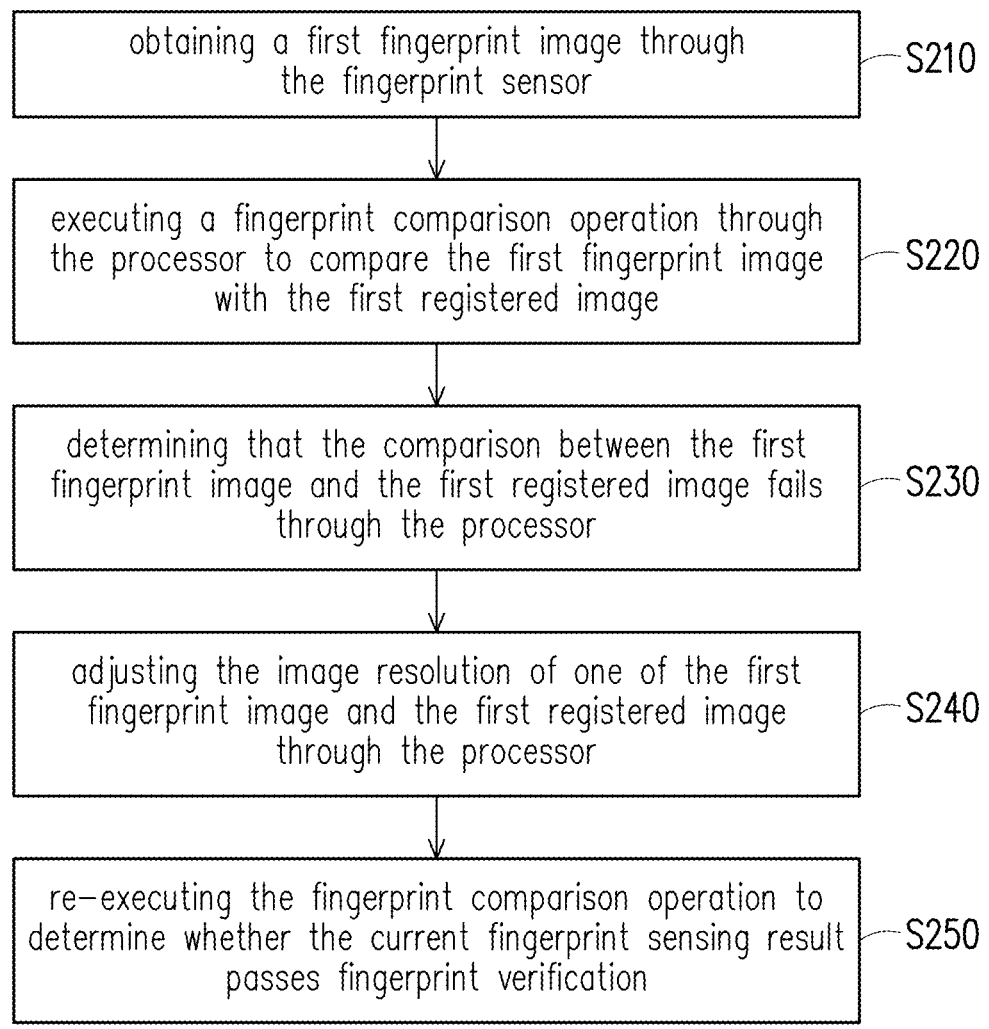
FIG. 2 is a flowchart of a fingerprint comparison method according to an embodiment of the disclosure.

FIG. 2 is a flowchart of a fingerprint comparison method according to an embodiment of the disclosure. With reference to FIG. 1 and FIG. 2, in the embodiment, the storage unit 130 may be stored with a first registered image in advance. The electronic device 100 may execute the following Steps S210 to S250 to implement fingerprint comparison. When the user intends to perform fingerprint verification, in Step S210, the electronic device 100 may obtain a first fingerprint image through the fingerprint sensor 120. In Step S220, the electronic device 100 may execute a fingerprint comparison operation through the processor 110 to compare the first fingerprint image with the first registered image. Regarding this, the processor 110 may compare multiple respective fingerprint features of the first fingerprint image and the first registered image. In detail, the processor 110 may determine whether at least one of the location of a fingerprint feature point, the number of fingerprint feature points, the width of a fingerprint ridge or valley, the brightness or darkness of the fingerprint pattern, and the ridge or valley direction of the fingerprint pattern of the first fingerprint image is the same as the first registered image to determine whether the comparison is successful or fails. However, regardless of whether the multiple respective fingerprint features of the first fingerprint image and the first registered image are the same, if the respective image resolutions of the first fingerprint image and the first registered image are different (or the degree of difference exceeds a predetermined range), the processor 110 determines that the comparison between the first fingerprint image and the first registered image fails. In other words, due to the different optical magnifications at which the fingerprint sensor 120 respectively captures the first fingerprint image and the first registered image during sensing, the resolutions of the first fingerprint image and the first registered image are different. The image comparison algorithm executed by the processor 110 outputs a computation result of comparison failure.

Furthermore, the reason for comparison failure may be that the image obtained by the fingerprint sensor 120 is affected by a protective film on the display panel such that the multiple fingerprint features in the first fingerprint image and the multiple corresponding fingerprint features in the first registered image cannot match. For example, at least one of the location of the fingerprint feature point, the number of the fingerprint feature points, the width of the fingerprint ridge or valley, the brightness or darkness of the fingerprint pattern, and the ridge or valley direction of the fingerprint pattern of the first fingerprint image and the first registered image do not match.

Therefore, in Step S230, the electronic device 100 may determine that the image comparison between the first fingerprint image and the first registered image fails through the processor 110. In Step S240, the electronic device 100 may adjust the image resolution (dots per inch, DPI) of one of the first fingerprint image and the first registered image through the processor 110. In other words, the electronic device 100 in the embodiment may automatically adjust the image resolution in an attempt to adjust the pattern sizes of the fingerprint features in the first fingerprint image and the first registered image to be the same. In Step S250, the electronic device 100 may re-execute the fingerprint comparison operation to determine whether a current fingerprint sensing result passes fingerprint verification. Accordingly, the electronic device 100 and the fingerprint comparison method of the embodiment may provide at least one additional fingerprint comparison and adjust the image resolution of one of the first fingerprint image and the first registered image to increase the success rate of fingerprint comparison.

Figure 3A:
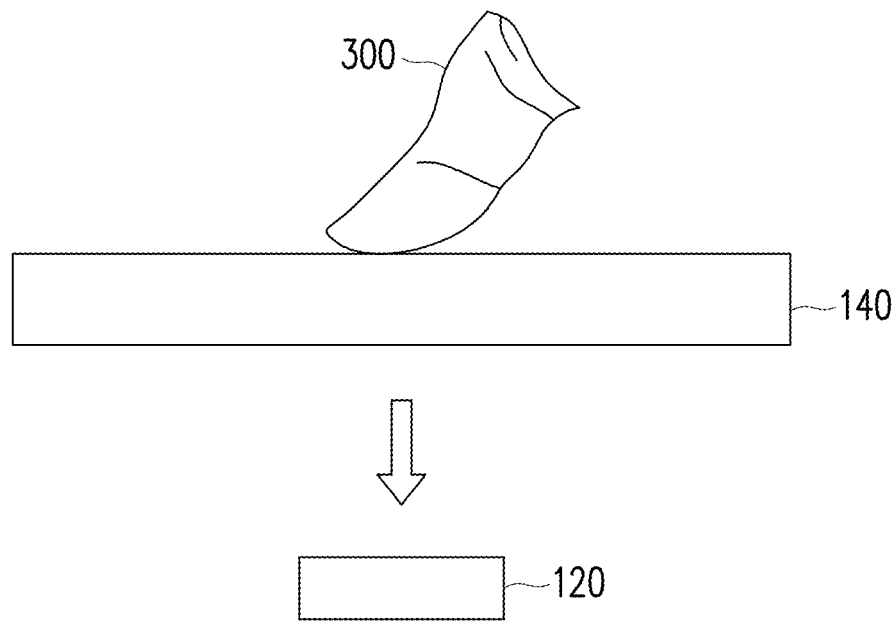
FIG. 3A is a schematic diagram of a fingerprint sensing scenario according to an embodiment of the disclosure.
Figure 3B:
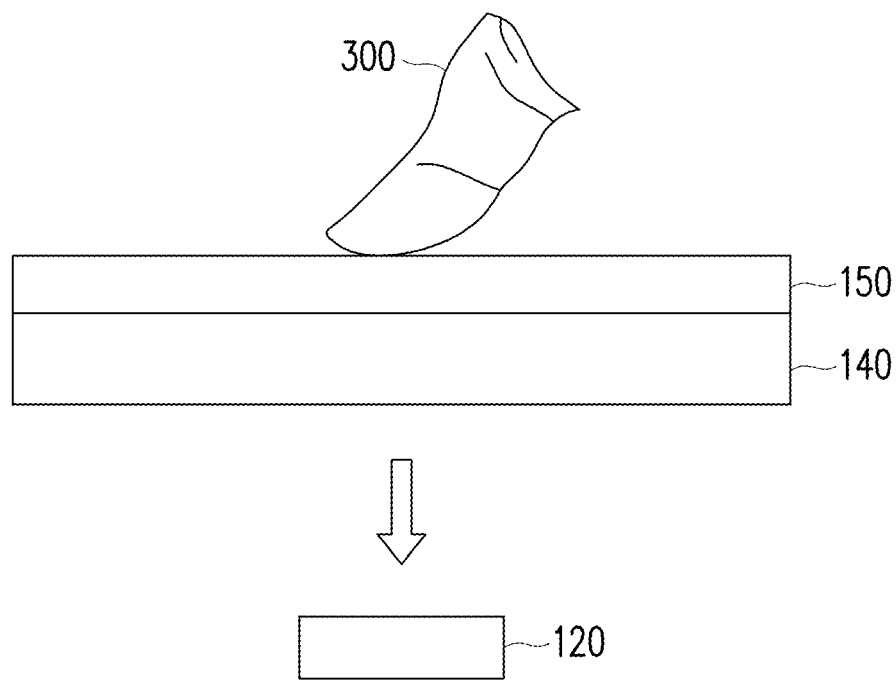
FIG. 3B is a schematic diagram of another fingerprint sensing scenario according to an embodiment of the disclosure.
Figure 4A:
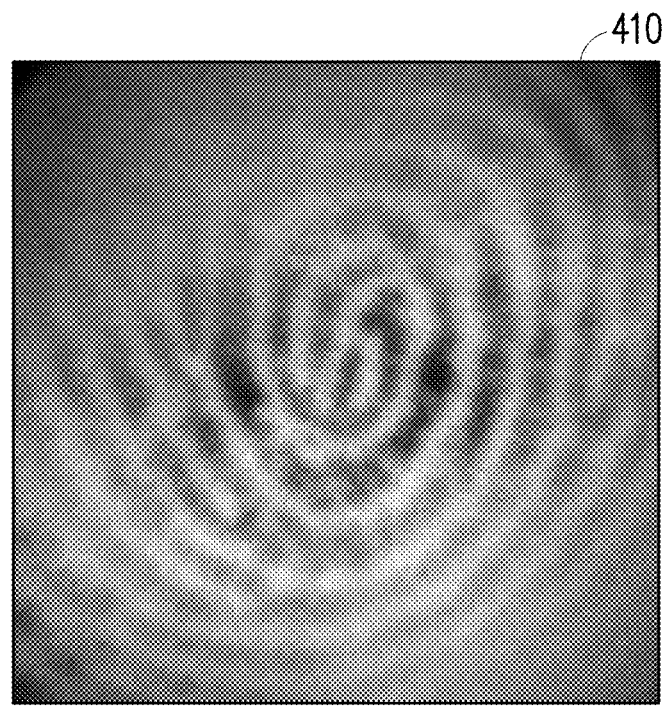
FIG. 4A is a schematic diagram of a fingerprint image according to an embodiment of the disclosure.
Figure 4B:
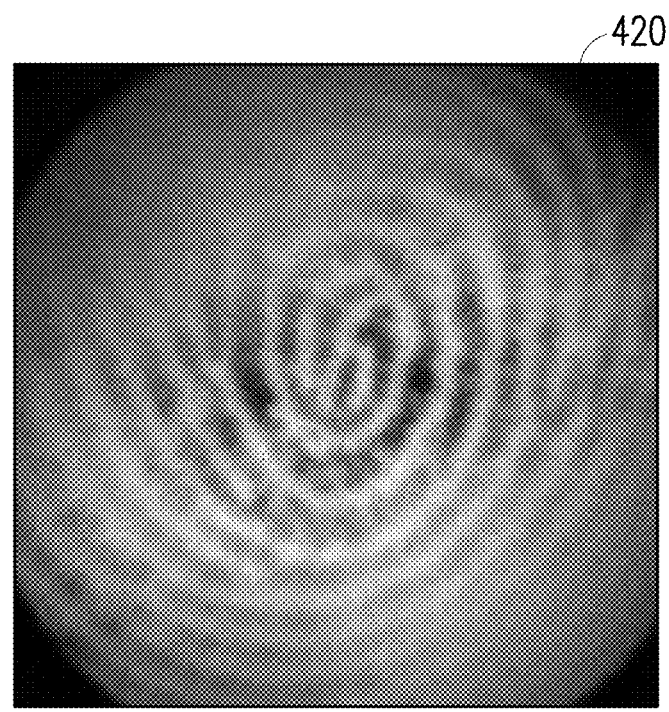
FIG. 4B is a schematic diagram of another fingerprint image according to an embodiment of the disclosure.

FIG. 3A is a schematic diagram of a fingerprint sensing scenario according to an embodiment of the disclosure. FIG. 3B is a schematic diagram of another fingerprint sensing scenario according to an embodiment of the disclosure. FIG. 4A is a schematic diagram of a fingerprint image according to an embodiment of the disclosure. FIG. 4B is a schematic diagram of another fingerprint image according to an embodiment of the disclosure. First, with reference to FIG. 1 and FIG. 3A, in an application scenario of the disclosure, the electronic device 100 may include a display panel 140, and the fingerprint sensor 120 is disposed at a fixed distance beneath the display panel 140. In the case where the display panel 140 does not include a protective film at first, when the user performs fingerprint registration, a finger 300 of the user approaches, touches, or presses against a fingerprint sensing area of the display panel 140 for the fingerprint sensor 120 to sense (or capture) the fingerprint of the finger 300 to obtain the first registered image.

Next, with reference to FIG. 1, FIG. 3B, FIG. 4A, and FIG. 4B, in the case where the user has attached a protective film 150 on the display panel 140, when the user performs fingerprint verification, the finger 300 of the user approaches, touches, or presses against the fingerprint sensing area of the display panel 140 again for the fingerprint sensor 120 to sense (or capture) the fingerprint of the finger 300 to obtain a first fingerprint image 410 as shown in FIG. 4A. Since the protective film 150 is attached on the display panel 140, the distance between the fingerprint sensor 120 and the finger 300 is increased (the longer the object distance, the larger the image), and the optical magnification at which the fingerprint sensor 120 captures an image is also changed, such that the width of ridge or valley of the multiple fingerprint features in the first fingerprint image 410 is thinner than that under a condition without the protective film 150. In addition, the location of the fingerprint feature point, the number of the fingerprint feature points, the brightness or darkness of the fingerprint pattern, and the ridge or valley direction of the fingerprint pattern of the first fingerprint image may also be different from those under the condition without the protective film 150. Therefore, the processor 110 may lower the image resolution of the first fingerprint image 410 to generate a second fingerprint image 420 as shown in FIG. 4B. Lowering the image resolution thickens the pattern of the fingerprint features or changes the location of the fingerprint feature point, the number of the fingerprint feature points, the brightness or darkness of the fingerprint pattern, or the ridge or valley direction of the fingerprint pattern of the multiple fingerprint features in the first fingerprint image 410. In following, the processor 110 performs fingerprint comparison again to compare the second fingerprint image 420 with the first registered image. In other words, if the image resolution is the only difference between the first fingerprint image 410 and the first registered image, the processor 110 adjusts the image resolution of the first fingerprint image 410 again and generates the second fingerprint image 420. Moreover, when the image resolution of the second fingerprint image 420 is with the same as or close to the image resolution of the first registered image, the fingerprint comparison between the second fingerprint image 420 and the first registered image has a higher chance of success (compared to the comparison between the first fingerprint image 410 and the first registered image).

Similarly, in another application scenario of the disclosure, in the case where the display panel 140 includes a first protective film, when the user performs fingerprint registration, a finger of the user approaches, touches, or presses against the fingerprint sensing area of the display panel 140 for the fingerprint sensor 120 to sense (or capture) the fingerprint of the finger to obtain another first registered image. Then, in the case where the user has attached a second protective film on the display panel 140 (the user has changed the protective film), when the user performs fingerprint verification, the finger of the user approaches, touches, or presses against the fingerprint sensing area of the display panel 140 again for the fingerprint sensor 120 to sense (or capture) the fingerprint of the finger to obtain another first fingerprint image. Since the protective film attached on the display panel 140 is changed, and the first protective film and the second protective film may be different in thickness (or different in refractive index), such as the thickness of the second protective film is greater than the thickness of the first protective film, the distance between the fingerprint sensor 120 and the finger is increased (the longer the object distance, the larger the image) and the optical magnification at which the fingerprint sensor 120 captures an image is also changed, such that the thickness of the fingerprint pattern of the multiple fingerprint features in the another first fingerprint image obtained under a condition of the second protective film attached is thinner than that under a condition of the first protective film attached (the location of the fingerprint feature point, the number of the fingerprint feature points, the brightness or darkness of the fingerprint pattern, and the ridge or valley direction of the fingerprint pattern may be different as well). Therefore, the processor 110 may lower the image resolution of the another first fingerprint image to generate another second fingerprint image. Lowering the image resolution thickens the fingerprint pattern or changes the location of the fingerprint feature point, the number of the fingerprint feature points, the brightness or darkness of the fingerprint pattern, or the ridge or valley direction of the fingerprint pattern. Then, the processor 110 performs fingerprint comparison again. Therefore, the comparison between the another second fingerprint image and the another first registered image performed by the processor 110 again has a higher chance of success.

However, the disclosure is not limited to adjusting the first fingerprint image 410. In other embodiments of the disclosure, the fingerprint sensor 120 may also obtain the fingerprint image for registration under the scenario of FIG. 3B and obtain the fingerprint image for verification under the scenario of FIG. 3A (for example, the user removes the protective film after fingerprint registration). In other words, the processor 110 may also lower the image resolution of the first registered image to generate a second registered image. Then, the processor 110 performs fingerprint comparison again to compare the first fingerprint image 410 with the second registered image. Therefore, the electronic device 100 and the fingerprint comparison method of the embodiment may lower the image resolution of one of the first fingerprint image and the first registered image to increase the success rate of fingerprint comparison.

Figure 5:
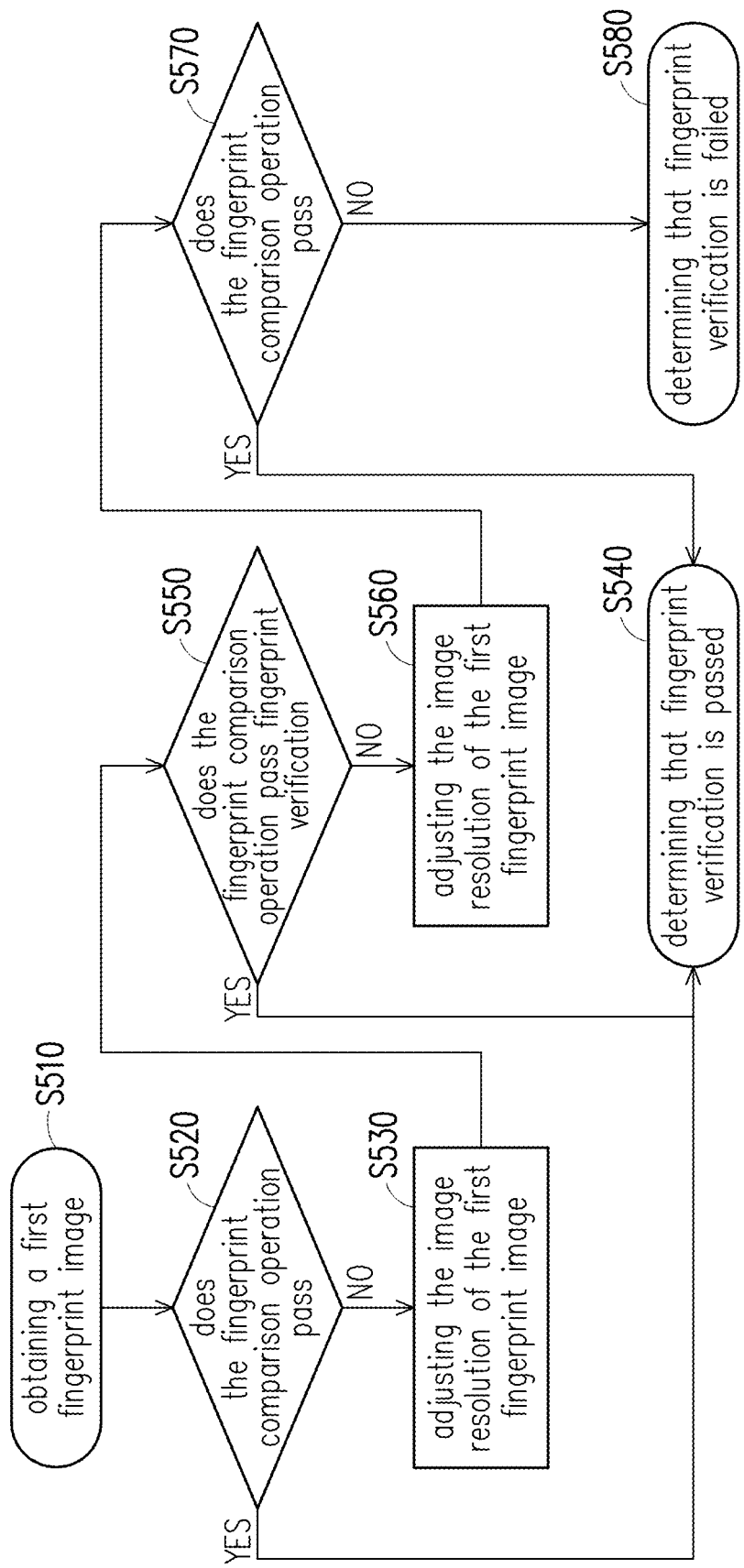
FIG. 5 is a flowchart of a fingerprint comparison method according to another embodiment of the disclosure.

FIG. 5 is a flowchart of a fingerprint comparison method according to another embodiment of the disclosure. With reference to FIG. 1 and FIG. 5, in the embodiment, the storage unit 130 may be stored with a first registered image in advance. The electronic device 100 may execute the following Steps S510 to S580 to implement fingerprint comparison. When the user intends to perform fingerprint verification, in Step S510, the electronic device 100 may obtain a first fingerprint image through the fingerprint sensor 120. In Step S520, the electronic device 100 performs fingerprint comparison and determines whether the fingerprint comparison operation passes. In the embodiment, the processor 110 compares the first fingerprint image and the first registered image. If yes, the processor 110 executes Step S540 to determine that the fingerprint verification is passed. If not, it represents that the comparison between the first fingerprint image and the first registered image fails.

In Step S530, the processor 110 adjusts the image resolution of the first fingerprint image to generate a second fingerprint image. In the embodiment, the processor 110, for example, lowers the image resolution of the first fingerprint image, so that the image resolution of the second fingerprint image is a first percentage (X %) of the image resolution of the first fingerprint image. In Step S550, the processor 110 performs fingerprint comparison again and determines whether the fingerprint comparison passes. If yes, the processor 110 executes Step S540 to determine that the fingerprint verification is passed. If not, it represents that the comparison between the second fingerprint image and the first registered image fails.

In Step S560, the processor 110 adjusts the image resolution of the first fingerprint image (again) to generate a third fingerprint image. In the embodiment, the processor 110, for example, lowers the image resolution of the first fingerprint image, so that the image resolution of the third fingerprint image is a second percentage (Y %) of the image resolution of the first fingerprint image. The first percentage (X %) is different from the second percentage (Y %). In some embodiments of the disclosure, the first percentage (X %) and the second percentage (Y %) may, for example, satisfy Relation (1) below.

$$X\% = \frac{(100\% + Y\%)}{2} \qquad \text{(Relation 1)}$$

In Step S570, the processor 110 performs fingerprint comparison again and determines whether the fingerprint comparison passes. If yes, the processor 110 executes Step S540 to determine that the fingerprint verification is passed. If not, it represents that the comparison between the third fingerprint image and the first registered image fails. The processor 110 executes Step S580 to determine that the fingerprint verification is failed.

However, the disclosure is not limited to adjusting the image resolution of the first fingerprint image. In other embodiments of the disclosure, in the above Steps S520 and S530, when the comparison between the first fingerprint image and the first registered image fails, the processor 110 may adjust the image resolution of the first fingerprint image to generate the second registered image. Moreover, the processor 110 re-executes the fingerprint comparison operation to compare the first fingerprint image with the second registered image. The image resolution of the second registered image is the first percentage (X %) of the image resolution of the first registered image. In the above Steps S550 and S560, when the comparison between the first fingerprint image and the second registered image fails, the processor 110 adjusts the image resolution of the first registered image to generate the third registered image. The image resolution of the third registered image is the second percentage (Y %) of the image resolution of the first registered image. Moreover, the processor 110 re-executes the fingerprint comparison operation to compare the first fingerprint image with the third registered image.

In addition, the disclosure is not limited to lowering the image resolution of the first fingerprint image or the first registered image. In other embodiments of the disclosure, the processor 110 may also increase the image resolution of the first fingerprint image or the first registered image to perform fingerprint comparison multiple times. Furthermore, the number of adjustments the image resolution of the first fingerprint image or the first registered image in one fingerprint verification event (for the same fingerprint image) of the disclosure is not limited to the two times as shown in FIG. 5, and the number of adjustments may be designed according to different usage requirements or hardware conditions.

In summary, the electronic device with fingerprint sensing function and the fingerprint comparison method of the disclosure may adjust the image resolution of one of the fingerprint image and registered image to effectively solve the issue of the image obtained by the fingerprint sensor being affected by the protective film on the display panel, thereby increasing the success rate of fingerprint comparison.

Although the disclosure has been disclosed in the above embodiments, the embodiments are not intended to limit the disclosure. Persons skilled in the art may make some changes and modifications without departing from the spirit and the scope of the disclosure. Accordingly, the protection scope of the disclosure shall be defined by the appended claims.

What is claimed is:

1. An electronic device with fingerprint sensing function, comprising:
   a fingerprint sensor, configured to obtain a first fingerprint image; and
   a processor, coupled to the fingerprint sensor and configured to execute a fingerprint comparison operation to compare the first fingerprint image with a first registered image, wherein
   when comparison between the first fingerprint image and the first registered image fails, the processor adjusts an image resolution of one of the first fingerprint image and the first registered image, and re-executes the fingerprint comparison operation to determine whether a current fingerprint sensing passes fingerprint verification,
   wherein when comparison between the first fingerprint image and the first registered image fails, the processor adjusts the image resolution of the first fingerprint image to generate a second fingerprint image, and the processor re-executes the fingerprint comparison operation to compare the second fingerprint image with the first registered image, wherein the image resolution of the second fingerprint image is a first percentage of the image resolution of the first fingerprint image,
   wherein when comparison between the second fingerprint image and the first registered image fails, the processor adjusts the image resolution of the first fingerprint image to generate a third fingerprint image, and the processor re-executes the fingerprint comparison operation to compare the third fingerprint image with the first registered image, wherein the image resolution of the third fingerprint image is a second percentage of the image resolution of the first fingerprint image, and the first percentage is different from the second percentage,
   wherein the first percentage is higher than the second percentage.

2. The electronic device according to claim 1, wherein when comparison between the third fingerprint image and the first registered image fails, the processor determines that the current fingerprint sensing does not pass fingerprint verification.

3. The electronic device according to claim 1, wherein the first percentage and the second percentage satisfy Relation (1) below:

$$X\% = \frac{(100\% + Y\%)}{2}, \qquad \text{(Relation 1)}$$

where X % represents the first percentage and Y % represents the second percentage.

4. The electronic device according to claim 1, wherein the fingerprint sensor is an optical fingerprint sensor and the fingerprint sensor is disposed beneath a display panel.

5. A fingerprint comparison method, comprising:
   obtaining a first fingerprint image through a fingerprint sensor;
   executing a fingerprint comparison operation through a processor to compare the first fingerprint image with a first registered image;
   adjusting an image resolution of one of the first fingerprint image and the first registered image through the processor when comparison between the first fingerprint image and the first registered image fails; and
   re-executing the fingerprint comparison operation to determine whether a current fingerprint sensing passes fingerprint verification,
   the fingerprint comparison method further comprising:
   adjusting the image resolution of the first fingerprint image through the processor to generate a second fingerprint image when comparison between the first fingerprint image and the first registered image fails; and
   re-executing the fingerprint comparison operation through the processor to compare the second fingerprint image with the first registered image, wherein
   the image resolution of the second fingerprint image is a first percentage of the image resolution of the first fingerprint image,
   the fingerprint comparison method further comprising:
   adjusting the image resolution of the first fingerprint image through the processor to generate a third fingerprint image when comparison between the second fingerprint image and the first registered image fails; and
   re-executing the fingerprint comparison operation through the processor to compare the third fingerprint image with the first registered image, wherein
   the image resolution of the third fingerprint image is a second percentage of the image resolution of the first fingerprint image, and the first percentage is different from the second percentage,
   wherein the first percentage is higher than the second percentage.

6. The fingerprint comparison method according to claim 5, further comprising:

determining that the current fingerprint sensing does not pass fingerprint verification through the processor when comparison between the third fingerprint image and the first registered image fails.

7. The fingerprint comparison method according to claim 5, wherein the first percentage and the second percentage satisfy Relation (1) below:

$$X\% = \frac{(100\% + Y\%)}{2},\qquad \text{(Relation 1)}$$

where X % represents the first percentage and Y % represents the second percentage.

8. The fingerprint comparison method according to claim 5, wherein the fingerprint sensor is an optical fingerprint sensor and the fingerprint sensor is disposed beneath a display panel.

9. An electronic device with fingerprint sensing function, comprising:
a fingerprint sensor, configured to obtain a first fingerprint image; and
a processor, coupled to the fingerprint sensor and configured to execute a fingerprint comparison operation to compare the first fingerprint image with a first registered image, wherein
when comparison between the first fingerprint image and the first registered image fails, the processor adjusts an image resolution of one of the first fingerprint image and the first registered image, and re-executes the fingerprint comparison operation to determine whether a current fingerprint sensing passes fingerprint verification,
wherein when comparison between the first fingerprint image and the first registered image fails, the processor adjusts the image resolution of the first registered image to generate a second registered image, and the processor re-executes the fingerprint comparison operation to compare the first fingerprint image with the second registered image, wherein the image resolution of the second registered image is a first percentage of the image resolution of the first registered image.

10. The electronic device according to claim 9, wherein when comparison between the first fingerprint image and the second registered image fails, the processor adjusts the image resolution of the first registered image to generate a third registered image, and the processor re-executes the fingerprint comparison operation to compare the first fingerprint image with the third registered image, wherein the image resolution of the third registered image is a second percentage of the image resolution of the first registered image, and the first percentage is different from the second percentage.

11. A fingerprint comparison method, comprising:
obtaining a first fingerprint image through a fingerprint sensor;
executing a fingerprint comparison operation through a processor to compare the first fingerprint image with a first registered image;
adjusting an image resolution of one of the first fingerprint image and the first registered image through the processor when comparison between the first fingerprint image and the first registered image fails; and
re-executing the fingerprint comparison operation to determine whether a current fingerprint sensing passes fingerprint verification,
the fingerprint comparison method further comprising:
adjusting the image resolution of the first registered image through the processor to generate a second registered image when comparison between the first fingerprint image and the first registered image fails; and
re-executing the fingerprint comparison operation through the processor to compare the first fingerprint image with the second registered image, wherein
the image resolution of the second registered image is a first percentage of the image resolution of the first registered image.

12. The fingerprint comparison method according to claim 11, further comprising:
adjusting the image resolution of the first registered image through the processor to generate a third registered image when comparison between the first fingerprint image and the second registered image fails; and
re-executing the fingerprint comparison operation through the processor to compare the first fingerprint image with the third registered image, wherein
the image resolution of the third registered image is a second percentage of the image resolution of the first registered image, and the first percentage is different from the second percentage.

* * * * *